Dec. 10, 1968   HANS-JOACHIM KOCH ET AL   3,415,733
FRAMES FOR ELECTRODES FOR THE ELECTROLYTIC DECOMPOSITION
OF HYDROCHLORIC ACID AND METHOD FOR MAKING SUCH FRAMES
Filed April 19, 1966

INVENTORS
HANS-JOACHIM KOCH
KARL-HEINZ BERNDT
BY VOLKER DÖLLE

AGENT.

United States Patent Office

3,415,733
Patented Dec. 10, 1968

3,415,733
FRAMES FOR ELECTRODES FOR THE ELECTROLYTIC DECOMPOSITION OF HYDROCHLORIC ACID AND METHOD FOR MAKING SUCH FRAMES
Hans-Joachim Koch, Karl-Heinz Berndt, and Volker Dölle, Bitterfeld, Germany, assignors to VEB Elektrochemisches Kombinat Bitterfeld, Bitterfeld, Germany
Filed Apr. 19, 1966, Ser. No. 543,622
3 Claims. (Cl. 204—279)

ABSTRACT OF THE DISCLOSURE

Frames for electrodes, particularly made of graphite, used in the electrolytic decomposition of hydrochloric acid, in filter press-like electrolytic cells, and method for making such frames.

---

This invention relates to improved frames for electrodes used in the electrolytic decomposition of hydrochloric acid, and more particularly to such frames for graphite electrodes, used in filter press-like constructed electrolytic cells, and to a method for making such frames.

In the chlorination of a great variety of organic compounds, such as of benzene, methane, polyvinylchloride, etc., hydrochloric acid is formed as a by-product. The recovery of the by-product can be accomplished by chemical oxidation or electrolytic decomposition into hydrogen and chlorine gases. The aqueous hydrochloric acid solutions are very corrosive, especially in view of the elevated temperature of the hydrochloric acid and the various organic impurities and excess chlorine contained therein.

Electrolytic cells used for the decomposition of hydrochloric acid are constructed in a filter press-like manner wherein the anode and cathode areas are separated by diaphragms. Because of the corrosivity problems, practically only graphite plates are used as electrodes. These are secured in frames made of electrically non-conductive materials, and the frames are assembled into a block of electrolytic cells, similar to the arrangement used in filter presses.

In the prior art, phenol-formaldehyde resins filled with glass or asbestos fibers for better corrosion resistance, or steel frames coated with rubber or the like, have been used as the electrode frames. A drawback of these prior-art frame materials is that the rubber or like-coated steel is insufficiently resistant to the corrosive action of the acid, boosted by the corrosiveness of the organic impurities, and glass- or asbestos-fiber filled resin frames are difficult to prepare and repair.

It is an object of the present invention to provide improved frames for electrodes used in the electrolytic decomposition of hydrochloric acid, said frames having a material with improved corrosion resistance, and improved mechanical properties over the materials presently used for the above purpose.

In accordance with the invention, it was found that an improved frame material is provided by the use of a graphite-filled castable phenol-formaldehyde resin, wherein the volume ratio of resin to graphite is between 1.11 and 0.76. The term "castable" as used in the present specification and claims, is intended to denote that the resin is of a formulation which, before curing, has a viscous, but free-flowing character with a powdered filler, such as graphite in the above concentration range, being suspended therein.

Figure 1:
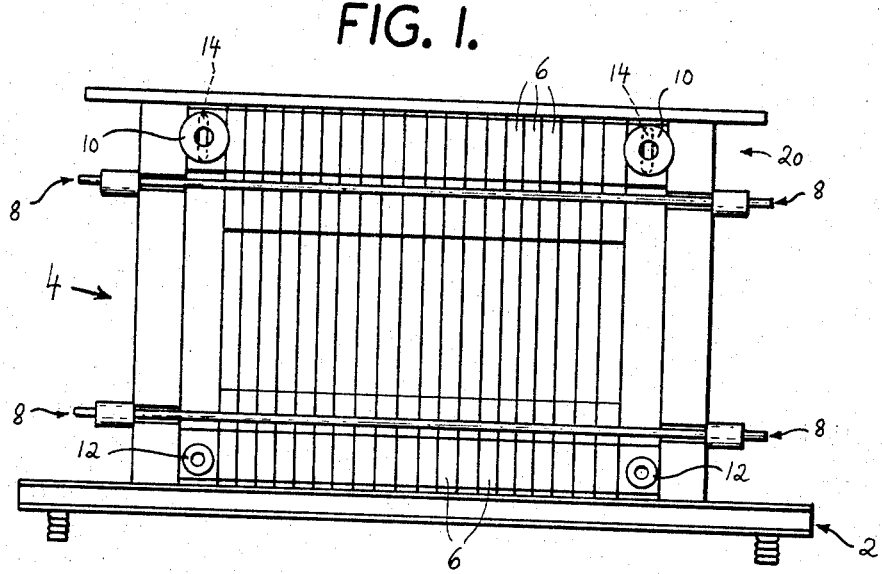
Figure 2:
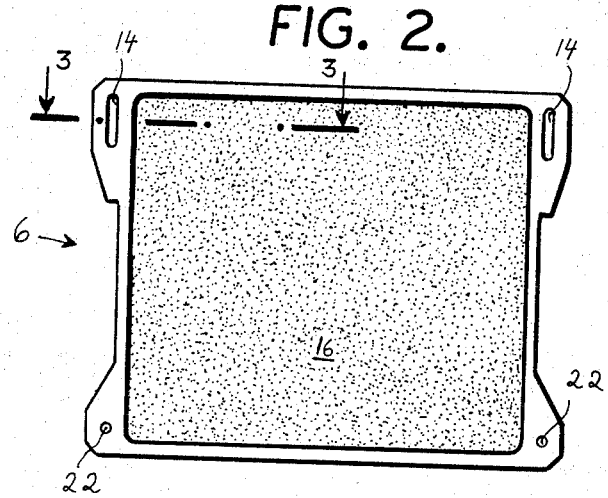
Figure 3:
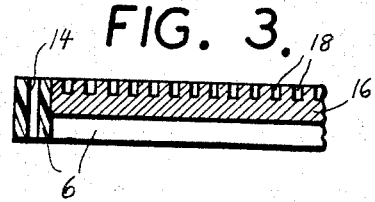

The invention is described in greater detail hereinbelow, with reference being had to the accompanying drawing, wherein FIG. 1 is a side-elevational view of an electrolytic cell constructed in a filter press-like manner;

FIG. 2 is a front-elevational view of a cell element or frame according to the invention, forming part of the electrolytic cell of FIG. 1, with a graphite electrode inserted therein; and FIG. 3 is a cross-sectional view of a portion of the frame with the graphite electrode, taken along the line 3—3 of FIG. 2.

The electrolytic cell shown in FIG. 1 is disposed on an insulated base 2, constituted by a rubber-coated or covered metal frame supported by insulators. The cell, generally designated 4, includes a plurality of cell elements or frames 6 held together by tie-rods 8. The cell 4 is provided with a number of flanges 10, 12 serving respectively as liquid inlets and outlets. The liquid enters the electrolytic cell 4 at the top flanges 10 and leaves the same through the bottom flanges 12. The top flanges 10 also serve as gas outlets, communicating with slots 14 of the frames 6 (see also FIG. 2).

The cell 4 contains graphite electrodes 16, held in a spaced relationship, and mounted from the respective frames 6 (see also FIGS. 2 and 3). The electrodes are preferably ribbed on the cathode side, as shown by grooves 18 so as to allow the gas to escape, while they are smooth on the anode side. The electrodes are closed on their cathode sides by the frames 6, and recessed on their anode sides, as shown in FIG. 3. The frames 6 are made from a castable phenol-formaldehyde resin. At 20, an electrical connection is schematically indicated, which is disposed on the front plate of the cell 4 and conventionally includes copper rails or the like bar-shaped connecting elements (not shown).

The frames 6 have holes 22 which are liquid conduits providing communication between the frames as well as the liquid-outlet flanges 12. The aforementioned slots 14 provide similar communication between the frames 6 and the liquid inlets-gas outlets 10. The respective communicating holes and slots are in fluid communication with the anode and cathode spaces in a well known manner. The assembly of the electrolytic cell 4 will be readily understood from the above description, from the drawing and the known elements of similar devices, by those skilled in the art.

Even though the graphite powder-filled phenol-formaldehyde resin frames 6 according to the present invention have a small electrical conductivity in the range of 0.8 $ohms^{-1}.cm.^{-1}$, it was surprisingly found that this does not detrimentally influence the utility of the material. In fact, the filled frame materials of the invention show improved chemical corrosion resistance over the prior-art frame materials, and exhibit higher compressive strength of 500 to 600 kp./cm.$^2$, as against 400 to 450 kp./cm.$^2$ in the case of prior-art materials, 1 kp. (kilopond) being equal to 1 kg. (kilogram) $\times g$, where $g$ is the gravitational acceleration (9.78 m./s.$^2$ at the equator, and 9.81 m./s.$^2$ on the 45th degree of latitude); this is a feature important in filter press-like electrolytic cell construction.

The frames of the invention can be easily repaired by simply casting of additional graphite-filled resin into damaged frame areas. The newly cast material will cure and bond within about 10 minutes to the original frame material. The ease of repair is to be contrasted with the complicated procedures which have to be employed in repairing prior-art electrode frames. In the case of rubber or the like-covered steel frames, repair was often impossible when the rubber or like cover was damaged.

The phenol-formaldehyde resin used according to the invention can be cured by admixture of an acidic curing agent in a known manner, by adding the curing acid to the resin shortly before the resin filler suspension is being cast. Castability before curing, which is an important and unique characteristic of the filled resin of the invention, can be further utilized in the preparation of framed electrodes, in that instead of adhesively bonding of the electrode into the frame, as carried out in the prior art, the graphite electrode can be directly cast into the frame.

The 1.11 to 0.76 resin-to-graphite volume ratio is critical in that outside this range insufficient curing and lower compressive strength can result.

The following example sets forth the best mode contemplated for carrying out the invention, which is not limited to all features of the example.

Example

Equal parts by volume of a phenol-formaldehyde resin and graphite powder were mixed with hydrochloric acid as hardener. The mixture was thoroughly blended by stirring, and then cast into a mold into which a graphite electrode plate was inserted prior to casting. The cast resin cured within about 10 minutes, after which time the mold was opened and the frame, with the electrode cast in place, was removed from the mold. The frame had a conductivity of 0.8 ohms$^{-1}$.cm.$^{-1}$ and a compressive strength of 550. kp.kp./cm.$^2$.

We claim:

1. A frame of a castable phenol-formaldehyde resin, for an electrode used in a filter press-like constructed electrolytic cell, for the electrolytic decomposition of hydrochloric acid, including a graphite filler in the resin, the volume ratio of resin to graphite filler being between 1.11 and 0.76.

2. The frame as defined in claim 1, wherein a graphite electrode is encased in the frame.

3. A method of forming the frame as defined in claim 2, which comprises the steps of mixing a castable phenol-formaldehyde resin with graphite in a volume ratio of phenol-formaldehyde to graphite of 1.11 to 0.76, and with an effective amount of acidic curing agent, and encasing the periphery of a graphite electrode with the mixture.

References Cited

UNITED STATES PATENTS

| 3,242,065 | 3/1966 | De Nora et al. | 204—256 |
| 3,252,883 | 5/1966 | Schick | 204—279 |

FOREIGN PATENTS 633,541  12/1949  Great Britain.

HOWARD S. WILLIAMS, *Primary Examiner.*

D. R. JORDAN, *Assistant Examiner.*

U.S. Cl. X.R.

204—286, 297